United States Patent [19]
Jakob

[11] 3,709,558
[45] Jan. 9, 1973

[54] CHILD SAFETY SEAT
[75] Inventor: Hans Jakob, Sherman Oaks, Calif.
[73] Assignee: American Safety Equipment Corporation, Encino, Calif.
[22] Filed: Oct. 13, 1971
[21] Appl. No.: 188,855

[52] U.S. Cl..................................297/250, 297/389
[51] Int. Cl. ..............................................A47d 1/10
[58] Field of Search......297/250, 253, 254, 389, 255, 297/256

[56] References Cited

UNITED STATES PATENTS

| 2,875,816 | 3/1959 | Langefeld | 297/254 X |
| 3,325,213 | 6/1967 | Levy | 297/250 |
| 3,512,830 | 5/1970 | Norman | 297/250 |
| 3,596,986 | 8/1971 | Ragsdale | 297/250 |

Primary Examiner—Francis K. Zugel
Attorney—C. A. Miketta et al.

[57] ABSTRACT

A safety restraint device for a child for use with a vehicle seat and the conventionally installed safety belt including a body having bottom, rear and sidewalls, a plurality of straps connected to the body and adapted to be releasably secured about a child, and at least two spaced apart connecting devices for releasably securing the body to the vehicle seat through the safety belt, the connecting devices including a pair of D-shaped rings which are pivotally mounted in a sleeve that is fixedly mounted to the body and a strap end securing device mounted on the body for supporting the free end of the lap strap after it is engaged with the D-rings to aid in preventing disengagement between the rings and straps.

8 Claims, 5 Drawing Figures

PATENTED JAN 9 1973
3,709,558
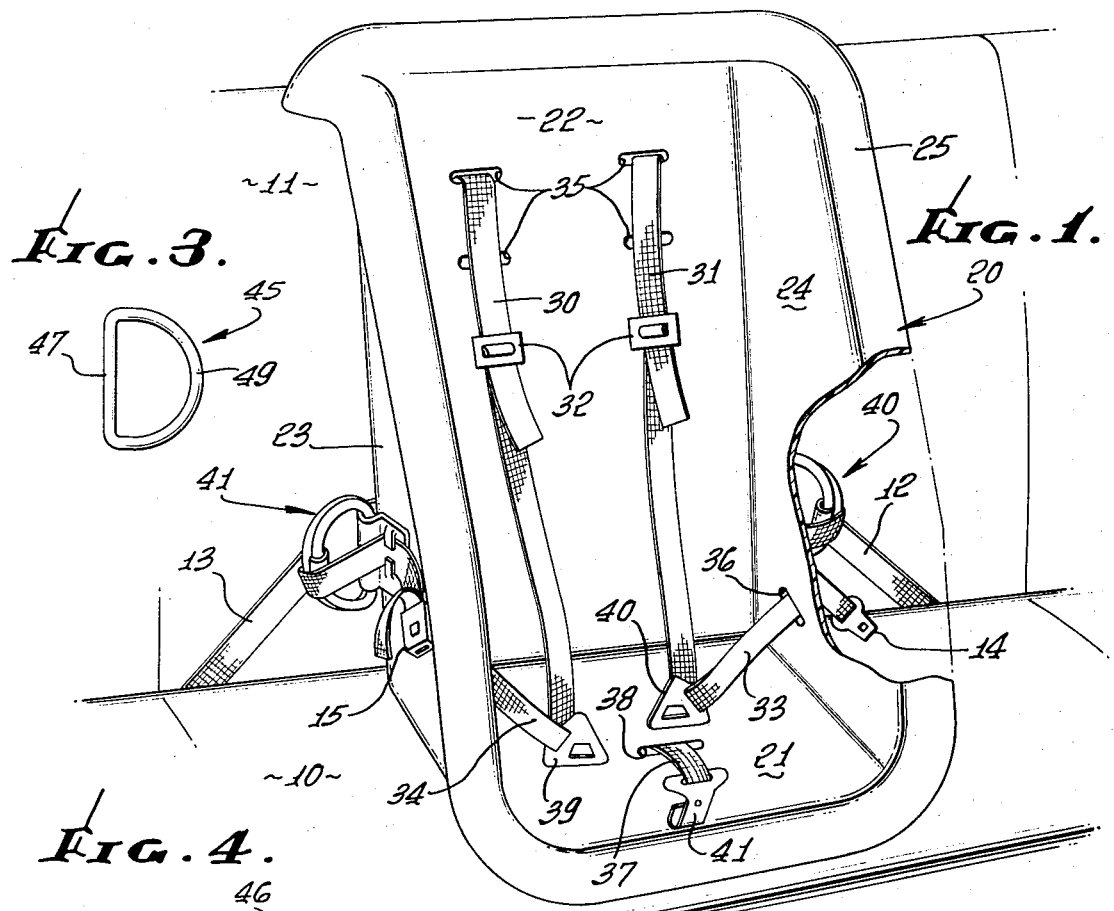
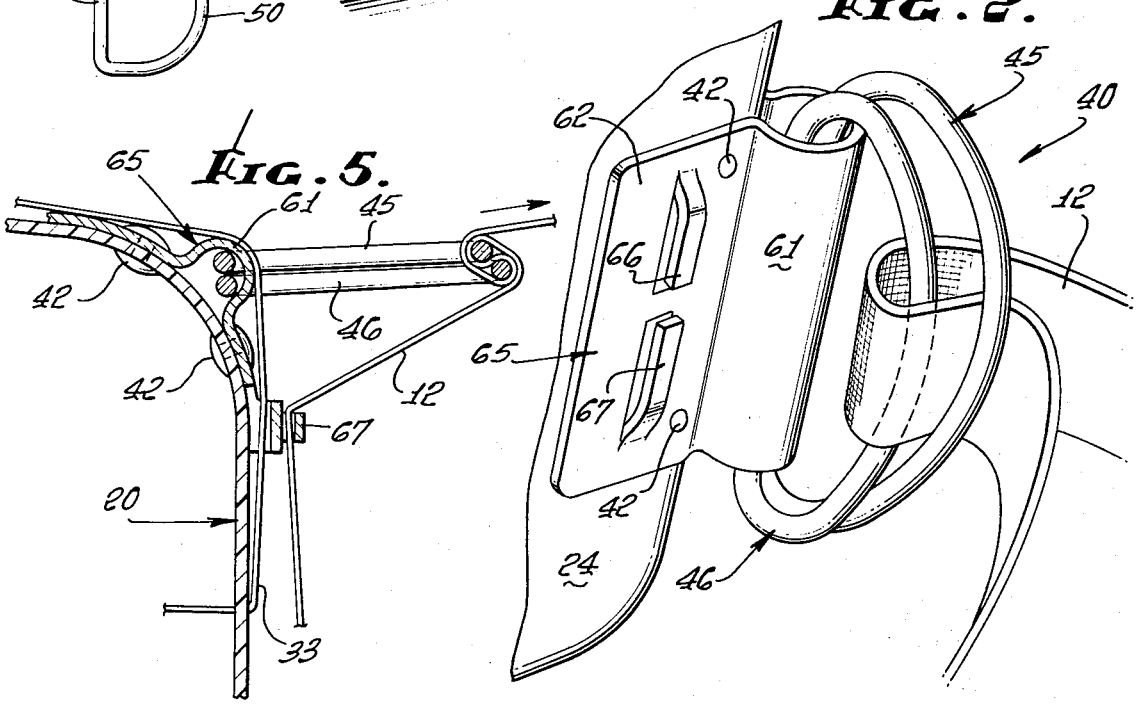

CHILD SAFETY SEAT

BACKGROUND AND PRIOR ART

There has been and presently is a recognition that adequate safety protection must be provided for infants or children in automobiles through a system which is separate from the safety restraint systems that are generally installed for the protection of adults. Many safety restraint systems for children comprise a separate seat which can be releasably mounted on a conventional bench or bucket type seat and having proportions which are particularly adapted to provide a child restraint system. Such seats are generally provided with a separate safety restraint system comprising a plurality of straps which secure the child relative to the seat body and additional means for securing the child's seat to the vehicle frame. It is well recognized that children's seats which are simply hung over the backrest of an automobile seat are unsatisfactory since the child's seat may become unmounted during impact allowing the child and seat to be thrown forwardly resulting in a dangerous second collision that can do substantial injury to the child. Since a child's seat cannot be conveniently permanently mounted to the vehicle seat, there is a problem in providing suitable means for securing the child's seat not merely to the automobile seat which may also become unmounted in a collision but to the frame of the vehicle.

It will be apparent that the most suitable system for restraining the child would employ the conventionally installed adult safety belt to secure the child's seat relative to the vehicle frame rather than to the vehicle seat. Such securing means must not only provide a positive securement to the vehicle frame through the conventional safety belt but must also be conveniently and quickly attachable to the safety belt to permit selected use of the child's seat to change its location as desired.

SUMMARY OF THE INVENTION

In view of the background and prior art discussed above, it is a general object of the present invention to provide a child's safety restraining system which includes a separate child's seat that may be quickly and easily secured through the conventional safety belt installed in automobiles to the vehicle frame. It is another object of the invention to provide a child's seat for a safety restraint system as described which requires no modification of the conventional safety straps in the vehicle in order to be operative and which may be simply connected or disconnected for selective use. Yet another object is to provide a child's seat which will permit the seat to be laterally positioned at various locations relative to the automobile seat while utilizing the conventional safety belt strap to secure the child's seat to the frame without any modification thereof. It is still another object of the present invention to provide a child's seat in which the connecting means is inexpensive, reliable, and which requires little or no maintenance during its useful life. Another important object of this invention is to provide a securing means for a child seat which will withstand various collision conditions such as frontal collisions, rear end collisions, side impacts as well as roll overs; many prior art seats provide good protection during frontal or rear end collisions, but are poorly designed to protect a child from side impacts due to resulting heavy rocking motion of the child safety seat.

Generally, the present invention comprises a safety restraint system for a child for use with a vehicle seat and a conventional safety belt restraint assembly including two separate lap straps anchored at their ends at spaced apart locations, the system comprising a seat or body having bottom, rear and sidewalls, safety restraint means connected to the body and adapted to be releasably secured about a child, and at least two spaced apart connecting means for releasably securing the body to the vehicle seat through the lap strap, each of such means including a pair of D-shaped rings mounted in elongated generally cylindrical sleeves fixedly mounted to the body and receiving the straight portions of the D-shaped rings for pivotal mounting thereof, and a strap end securing device for supporting the free end of the lap strap after it is engaged with the rings to aid in preventing disengagement between the rings and straps.

BRIEF DESCRIPTION OF THE DRAWINGS

FIG. 1 is a perspective view of a safety restraint system for a child for use with a vehicle seat and a conventional safety belt restraint assembly showing an exemplary embodiment of the improvement of the present invention;

FIG. 2 is a detailed perspective view of the improvement of the present invention;

FIG. 3 is a side elevation view of one of the D-rings;

FIG. 4 is a side elevation view of the other D-ring; and

FIG. 5 is sectional view showing the D-rings and vehicle safety belt engaged.

DETAILED DESCRIPTION OF THE PREFERRED EMBODIMENT

Referring now to the drawing, there is shown a safety restraint system for a child for use in a conventional vehicle which includes a seat having a seat portion 10 and a backrest 11. It will be understood that while a bench type seat is illustrated, the child restraint system of the present invention can be used in conjunction with a bucket type of seat. The vehicle is provided with a conventional safety belt restraint assembly which includes two separate lap straps 12, 13 which have complementary connecting members such as the tongue plate 14 on the lap strap 12 and the buckle 15 on the lap strap 13. The lap straps 12, 13 are anchored behind the seat at spaced apart locations in a manner well known to those skilled in the art.

The child safety restraint system includes a seat or body 20 for supporting a child in the sitting position and includes a bottom wall 21, a rear wall 22, and sidewalls 23, 24. The body may be constructed or molded from a high strength plastic material and may be provided with a lip 25 which extends around the entire peripheral edge of the seat. As seen in FIG. 1, the bottom wall 21 rests on the seat portion 10 of the vehicle seat and the rear wall 22 abuts the backrest 11 of the vehicle seat.

The child's seat is provided with safety restraint means for the child which is adapted to be releasably secured about the child and may include a pair of shoulder or chest straps 30, 31 with suitable adjusting members 32 and lap straps 33, 34 which, as in the exemplary embodiment, may be integral with shoulder straps 30, 31. The rear wall 22 is provided with openings 35 near the upper end of the rear wall through which the upper ends of the shoulder strap 30, 31 may pass. The sidewalls 23, 24 are provided with a slot, one of which is shown at 36, through which the lap strap 33, 34 may pass. The strap assembly may also include a crotch strap 37 passing through a slot 38 in the bottom wall of the seat 20. The shoulder, lap and crotch straps are releasably connected to secure the child relative to the seat 20 through suitable means such as the connector assembly including the plates 39, 40 and the hook shaped buckle 41. The buckle assembly comprising the elements 39, 40 and 41 is entirely conventional and well known to those having skill in the art. It will thus be seen that safety restraint means which is connected to the body 20 is provided for releasably securing a child relative to the body 20 by proper assembly of the child safety straps to effect a tensionally operative system. It will be understood that the described safety restraint means for the child is merely exemplary and various types of strap assemblies and one or more connectors may be utilized to releasably secure the child relative to the seat or body 20.

The improvement of the present invention relates to means for securing the seat 20 relative to the vehicle seat and thus restrain the child during an emergency condition. The improvement requires no modifications or changes to the conventional safety belt restraint assembly present in commercially available vehicles, such as automobiles, and yet allows the child seat 20 to be removed from the vehicle and put to other uses or to allow the vehicle seat to be occupied by an adult.

The improvement comprises at least two spaced apart connecting means indicated generally at 40 and 41 for releasably securing the body 20 to the vehicle seat through the lap strap 12, 13. In the exemplary embodiment, the connecting means 40, 41 are secured to the body 20 at the junction between the sidewalls 23, 24 and the rear wall 22 of the body. The connecting means are spaced upwardly from the bottom wall 21 a suitable distance to prevent the child seat 20 from rocking forward or sideways which could occur if the connecting means were positioned only slightly above the bottom wall 21 and yet is not positioned so high as would permit the bottom wall 21 to slide forwardly or sideways relative to the vehicle seat portion 10 when the child safety restraint means is under load during a headon collision or side impact. The precise location of the connecting means relative to the bottom wall 21 may be determined from the proportions of the seat. The connecting means 40, 41 are secured to the walls of the seat by suitable fasteners such as rivets as shown at 42 in FIG. 2 or by other conventional means.

Since the connecting means 40, 41 are in all respects identical, it will suffice to describe the details of only one of such devices such as the connecting means 40 shown in greater detail in FIG. 2. The connecting means 40 includes a pair of D-shaped rings, commonly referred to as D-rings, indicated generally at 45, 46. The D-shaped rings, to be described in greater detail hereinafter, are pivotally mounted with respect to the seat 20 in a generally cylindrical vertically oriented sleeve 61 formed metal and suitably fixedly mounted with respect to the body 20. In the exemplary embodiment, the sleeve 61 forms a part of a plate including a sidewall portion 62 and a rear wall portion (not shown) that is attached to the rear wall of the seat 20. It will of course be understood that such sleeve may be separate from the plate attached to the body and secured thereto by welding, fasteners, or other means well known in the art. The sleeve 61 is positioned adjacent the intersection of the body sidewall 24 and the rear wall 22.

The connecting means also includes a strap end securing device indicated generally at 65 which in the exemplary embodiment is integral with the side plate portion 62 and comprises a pair of spaced apart tabs 66, 67 which may be struck from the plate 62 to define an opening for receiving the vehicle strap as seen best in FIG. 1. It will be apparent to those having skill in the art that other means may be provided for securing the vehicle strap after it is passed through the D-rings in the manner to be hereinafter explained for supporting the free ends of the vehicle lap strap to prevent disengagement between the D-rings and the straps.

Referring now to FIG. 3, the D-ring 45 is shown comprising a straight portion 47 which is received in the sleeve 61 and an arcuate portion 49. Similarly, in FIG. 4, the D-ring 46 is shown comprising the straight portion 48 and an arcuate portion 50. As may be observed from comparing FIGS. 3 and 4 where the D-rings are illustrated with the approximate relative proportion that the D-ring 46 has a larger lateral dimension, i.e., the dimension measured between the straight portion 48 and the furthest point on the arcuate portion 50. Such dimensions may be measured across the ring perpendicular to the straight portion and it will be seen that the dimension of the ring 46 is greater than that of the ring 45. Proportioning of the rings as described will be seen to provide an advantageous frictional engagement between the lap strap and the D-rings when the lap straps are inserted as shown in FIG. 2. More particularly, it will be seen that the larger ring 46 is positioned forwardly of the ring 45 when the seat 20 is in position with its rear wall 22 abutting the vehicle seat backrest 11. The child's seat 20 is releasably secured by passing the lap strap, such as the strap 12 shown in FIG. 2, forwardly through the D-rings, then around the forward D-ring 46, then rearwardly under and around the rearward D-ring 45 and then forwardly. It will be appreciated that the belt may be wrapped around the rings in the opposite manner by inserting the end of the belt through the rings rearwardly, then forwardly around D-ring 45, between the rings, around ring 46 and rearwardly. Non-slip engagement between the belt and the D-rings is produced by one D-ring pressing against the other. This pressure increases proportionately by increasing tension force in the lap strap, which occurs during a collision when the child is loading up the seat. Increasing tension force in the lap strap increases friction force between the lap strap and the D-rings. This friction force is provided at any position of the D-rings relative to the child seat by using a forward D-ring 46 which is slightly larger than the rearward D-ring 45. Under load conditions the forward D-ring has a tendency to shift towards the child seat body 20 while the rearward D-ring has a tendency to shift away from the body 20 due to the geometry of the D-rings, the pivoting action and the play in the sleeve 61, as well as the forces of the lap strap acting against the D-rings, see FIG. 5. This shifting action forces the D- rings to separate sideways and loosens all friction forces. By making one D-ring larger than the other one, this condition is prevented.

Using the free end of the strap 12, in the position shown in FIG. 2, which has only a minimal engagement area with the D-ring 45, the belt is then passed forward and is inserted through the opening defined by the tabs 66, 67, so as to support the pressure of the D-rings pressing against each other and to pick up additional friction on the exterior surface of the belt which is passing about the forward D-ring 46. Thus, the engagement of the belt with the D-rings is increased by the provision of the strap end securing device indicated generally at 65. In this manner, there will be less possibility for the belt to work loose relative to the D-rings and yet the entire connecting means may be easily disassembled when it is not desired to use the seat.

It will thus be seen that the improvement of the present invention described in its exemplary form provides connecting means for a child's seat that may be used with the conventional automobile safety restraint lap straps without modification and yet is quickly releasable for removal of the seat when not in use. Various modifications and changes will occur to those having skill in the art to the exemplary embodiment of the invention as described without departing from the scope of the invention.

I claim:

1. A safety restraint device for a child and for use with a vehicle seat and a conventional safety belt restraint assembly including two separate lap straps each carrying complementary releasable connecting means at their free ends and anchored at their other ends at spaced apart locations, said device comprising:

a body having bottom, rear and sidewalls;

safety restraint means connected to said body and adapted to be releasably secured about a child; and at least two spaced apart connecting means for releasably securing said body to said vehicle seat through the lap straps each said means comprising a pair of D-shaped rings, an elongated generally cylindrical sleeve fixedly mounted on said body and receiving the straight portions of said D-shaped rings for pivotal mounting of said rings, and a strap end securing device for supporting the free end of the lap strap after it is engaged with said rings to aid in preventing disengagement between said rings and strap.

2. The device of claim 1 wherein said sleeves are positioned adjacent the intersection of said body side and rear walls.

3. The device of claim 2 wherein each of said sleeves includes integral plates fixedly mounted on said body and said strap end securing devices are integral with said plate.

4. The device of claim 3 wherein each of said strap end securing devices comprises a pair of spaced apart tabs struck from said plate to define an opening for receiving the vehicle strap.

5. The device of claim 1 wherein one of said D-shaped rings has a smaller dimension measured across the ring perpendicular to the straight portion than the other ring.

6. In a child safety restraint system for use in a vehicle having a seat including a backrest and a seat portion and at least two safety straps anchored in the vehicle behind and below the seat and passing between the backrest and seat portion comprising a seat body having bottom, side and rear walls for receiving a child therein in sitting position, and strap restraining means connected to said seat body for restraining the child against forward movement, the improvement comprising:

connecting means for rapidly and releasably securing the seat body to the safety straps including a pair of plates fixedly mounted adjacent the intersections of the body side and rear walls, a pivot sleeve mounted on each plate, a pair of D-rings received in each of the sleeves, and a pair of tabs struck from each plate and defining an opening for receiving the free end of the safety straps, whereby each of the straps may be passed through the D-rings, reversed so as to pass over one ring and under the other, and inserted through said tab-defined opening to secure the seat body against movement relative to the seat and to remain secured during use.

7. The improvement of claim 6 wherein the arcuate portion of one of said D-rings in each pair is larger than the arcuate portion of the other D-ring of the pair.

8. The improvement of claim 7 wherein said sleeve is spaced upwardly of the body bottom wall and when the seat body is positioned on the vehicle seat with the rear wall of the body against the backrest the straps pass forwardly through the D-rings, around the forward ring, rearwardly under and around the rearward ring and then forwardly through the tab-defined opening.

* * * * *